(12) United States Patent
Zheng et al.

(10) Patent No.: US 10,755,733 B1
(45) Date of Patent: Aug. 25, 2020

(54) READ HEAD INCLUDING SEMICONDUCTOR SPACER AND LONG SPIN DIFFUSION LENGTH NONMAGNETIC CONDUCTIVE MATERIAL AND METHOD OF MAKING THEREOF

(71) Applicant: SANDISK TECHNOLOGIES LLC, Addison, TX (US)

(72) Inventors: Yuankai Zheng, Fremont, CA (US); Christian Kaiser, San Jose, CA (US); Zhitao Diao, Fremont, CA (US)

(73) Assignee: SANDISK TECHNOLOGIES LLC, Addison, TX (US)

( * ) Notice: Subject to any disclaimer, the term of this patent is extended or adjusted under 35 U.S.C. 154(b) by 0 days.

(21) Appl. No.: 16/293,142

(22) Filed: Mar. 5, 2019

(51) Int. Cl.
  *G11B 5/39* (2006.01)
(52) U.S. Cl.
  CPC .......... *G11B 5/3909* (2013.01); *G11B 5/3906* (2013.01); *G11B 5/3929* (2013.01); *G11B 5/3954* (2013.01); *G11B 5/3967* (2013.01); *G11B 2005/3996* (2013.01)
(58) Field of Classification Search
  None
  See application file for complete search history.

(56) References Cited

U.S. PATENT DOCUMENTS

| | | | |
|---|---|---|---|
| 6,786,803 B2 | 9/2004 | Crawforth et al. | |
| 7,245,524 B2 | 7/2007 | Yoda et al. | |
| 7,385,790 B2 | 6/2008 | Inomata et al. | |
| 7,582,218 B2 | 9/2009 | Seagle | |
| 8,264,018 B2 | 9/2012 | Yoon et al. | |
| 8,291,743 B1 | 10/2012 | Shi et al. | |
| 8,331,063 B2 | 12/2012 | Hara et al. | |
| 8,361,541 B2 | 1/2013 | Lee et al. | |
| 8,375,565 B2 | 2/2013 | Hu et al. | |
| 8,443,510 B1 | 5/2013 | Shi et al. | |
| 8,498,083 B2 | 7/2013 | Koike et al. | |
| 8,593,766 B2 | 11/2013 | Tsuchiya et al. | |
| 8,717,709 B1 | 5/2014 | Shi et al. | |
| 8,735,565 B2 | 5/2014 | Poyart et al. | |
| 8,964,333 B1 | 2/2015 | Hu et al. | |
| 9,153,261 B1 | 10/2015 | Kerner et al. | |
| 9,321,146 B1 | 4/2016 | Rudy et al. | |
| 9,390,733 B2 | 7/2016 | Etoh et al. | |
| 2004/0097173 A1 | 5/2004 | Crawforth et al. | |
| 2006/0139817 A1 | 6/2006 | Inomata et al. | |
| 2006/0198184 A1 | 9/2006 | Yoda et al. | |
| 2007/0230063 A1 | 10/2007 | Seagle | |

(Continued)

OTHER PUBLICATIONS

U.S. Appl. No. 16/021,602, filed Jun. 28, 2018, SanDisk Technologies LLC.

*Primary Examiner* — Craig A. Renner
(74) *Attorney, Agent, or Firm* — The Marbury Law Group, PLLC

(57) ABSTRACT

A read head includes a first ferromagnetic layer, a second ferromagnetic layer, a first diffusion-assist nonmagnetic metallic layer located between the first ferromagnetic layer and the second ferromagnetic layer, a second diffusion-assist nonmagnetic metallic layer located between the first ferromagnetic layer and the second ferromagnetic layer, and a semiconductor spacer layer located between the first diffusion-assist nonmagnetic metallic layer and the second diffusion-assist nonmagnetic metallic layer.

14 Claims, 13 Drawing Sheets

(56) References Cited

U.S. PATENT DOCUMENTS

| | | | | |
|---|---|---|---|---|
| 2008/0062557 A1* | 3/2008 | Tsuchiya et al. | G11B 5/3909 | 360/324.1 |
| 2008/0100968 A1* | 5/2008 | Shimazawa et al. | G11B 5/3909 | 360/314 |
| 2008/0106827 A1* | 5/2008 | Shimazawa et al. | G11B 5/3906 | 360/324 |
| 2008/0112096 A1* | 5/2008 | Mizuno et al. | G11B 5/3906 | 360/324.12 |
| 2008/0117554 A1* | 5/2008 | Hara et al. | G11B 5/59683 | 360/324.2 |
| 2008/0170336 A1* | 7/2008 | Tsuchiya et al. | G11B 5/3906 | 360/324 |
| 2008/0174920 A1* | 7/2008 | Hara et al. | G11B 5/3906 | 360/326 |
| 2008/0198513 A1* | 8/2008 | Hara et al. | G11B 5/3906 | 360/324 |
| 2008/0218907 A1* | 9/2008 | Mizuno et al. | G11B 5/59683 | 360/313 |
| 2008/0218912 A1* | 9/2008 | Hirata | G11B 5/3906 | 360/324 |
| 2008/0226948 A1* | 9/2008 | Mizuno et al. | G11B 5/3906 | 428/811.2 |
| 2008/0278864 A1* | 11/2008 | Zhang et al. | G11B 5/3909 | 360/324.12 |
| 2009/0002893 A1* | 1/2009 | Tsuchiya et al. | G11B 5/3906 | 360/324 |
| 2009/0059443 A1* | 3/2009 | Tsuchiya et al. | G11B 5/3909 | 360/324.2 |
| 2009/0067099 A1* | 3/2009 | Tsuchiya et al. | G11B 5/3906 | 360/314 |
| 2009/0086383 A1* | 4/2009 | Hara et al. | G11B 5/3906 | 360/324 |
| 2009/0128965 A1 | 5/2009 | Mizuno et al. | | |
| 2009/0162847 A1 | 6/2009 | Poyart et al. | | |
| 2010/0097722 A1* | 4/2010 | Chou et al. | G11B 5/3906 | 360/324 |
| 2010/0124617 A1* | 5/2010 | Matsuzawa et al. | G11B 5/3906 | 427/470 |
| 2010/0214701 A1* | 8/2010 | Tsuchiya et al. | G11B 5/3906 | 360/324.12 |
| 2010/0289084 A1 | 11/2010 | Yoon et al. | | |
| 2011/0007421 A1 | 1/2011 | Hara et al. | | |
| 2011/0027618 A1 | 2/2011 | Lee et al. | | |
| 2011/0294398 A1 | 12/2011 | Hu et al. | | |
| 2012/0196153 A1 | 8/2012 | Matsuzawa et al. | | |
| 2012/0212859 A1 | 8/2012 | Tsuchiya et al. | | |
| 2012/0212860 A1* | 8/2012 | Koike et al. | G11B 5/3906 | 360/313 |
| 2012/0237796 A1 | 9/2012 | Koike et al. | | |
| 2012/0306004 A1 | 12/2012 | Yoon et al. | | |
| 2015/0103434 A1 | 4/2015 | Etoh et al. | | |
| 2015/0260757 A1 | 9/2015 | Li et al. | | |
| 2015/0287428 A1 | 10/2015 | Kerner et al. | | |
| 2017/0200487 A1 | 7/2017 | Kim et al. | | |
| 2018/0308514 A1 | 10/2018 | Li et al. | | |

* cited by examiner

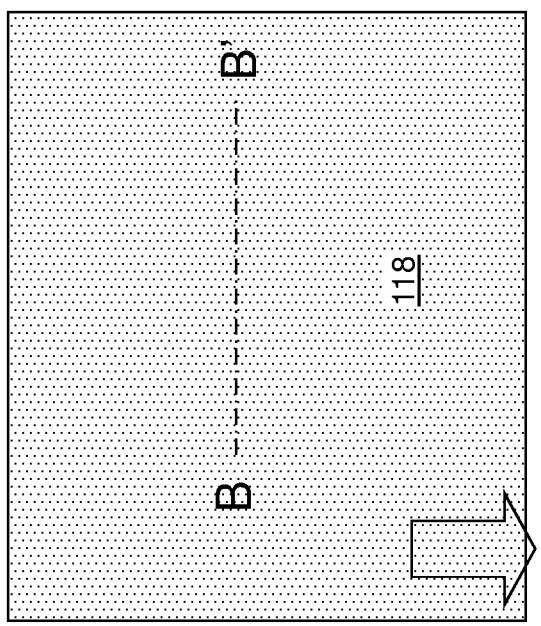
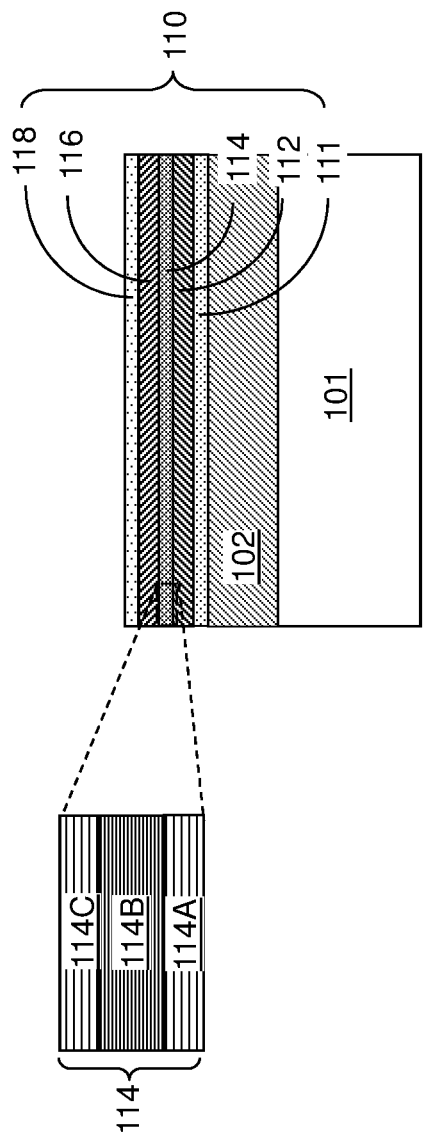
FIG. 4A
FIG. 4B

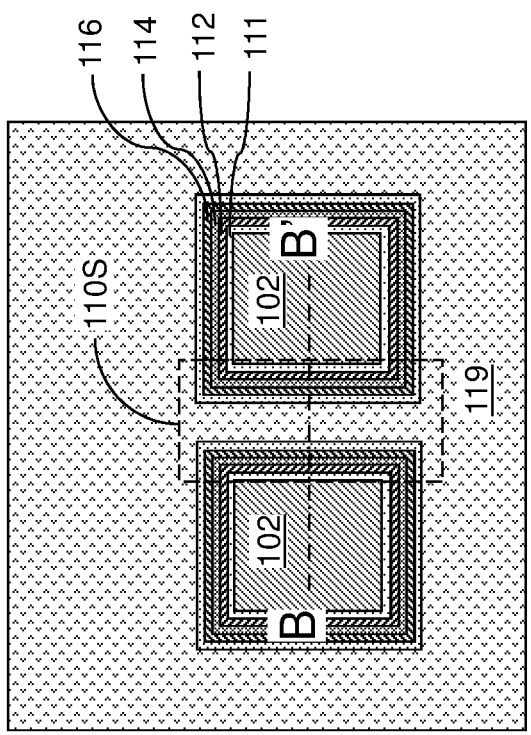
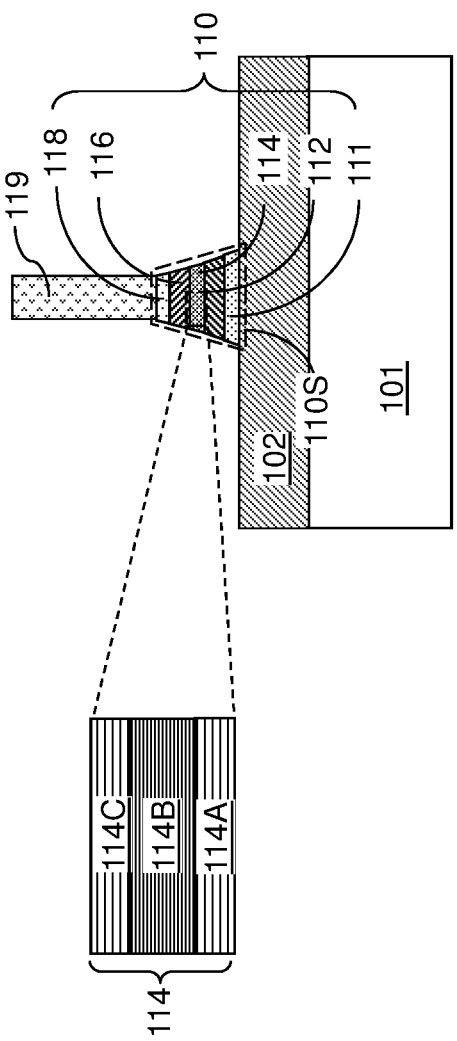
FIG. 5A
FIG. 5B

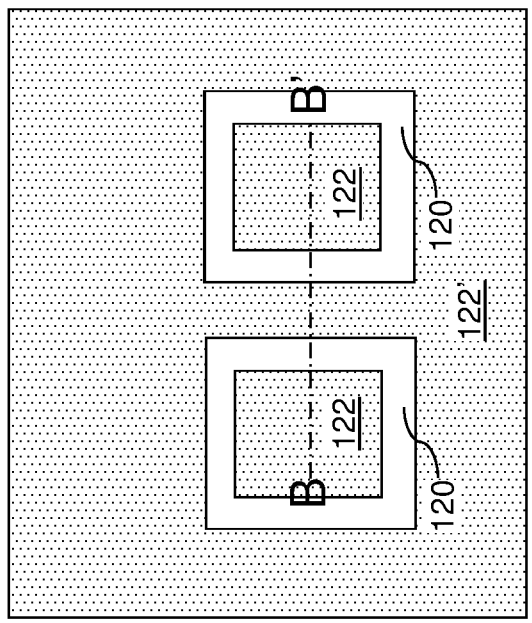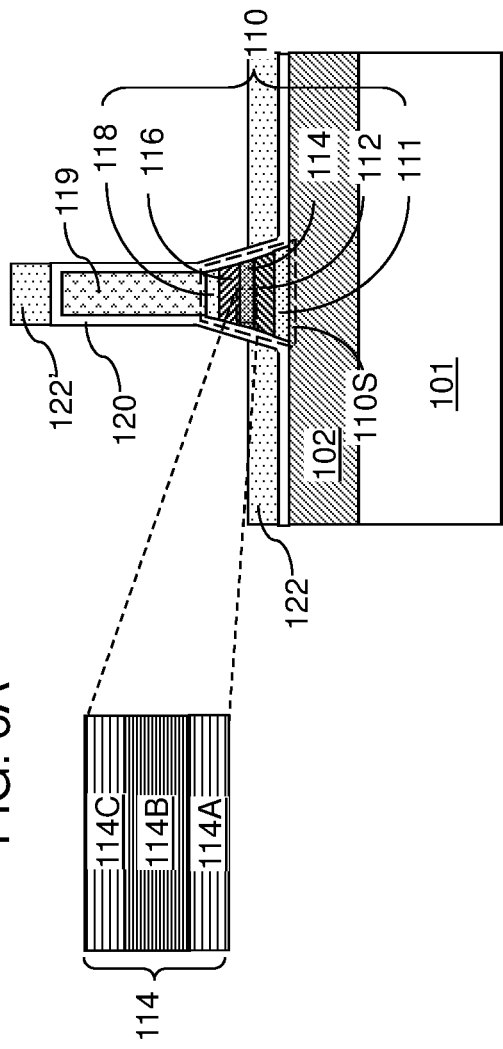
FIG. 6A
FIG. 6B

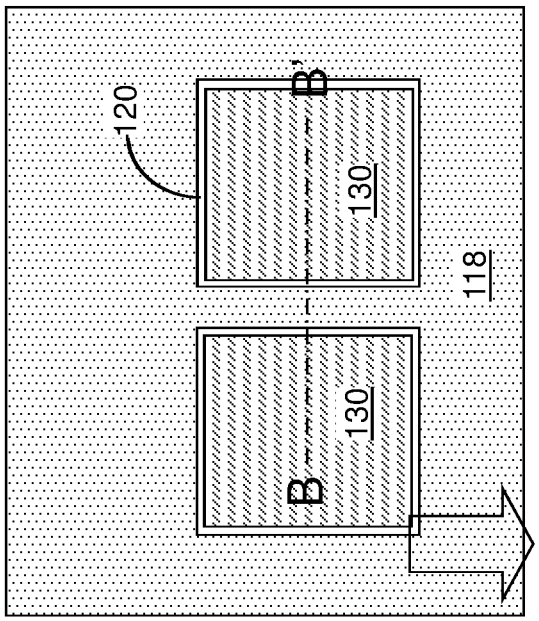
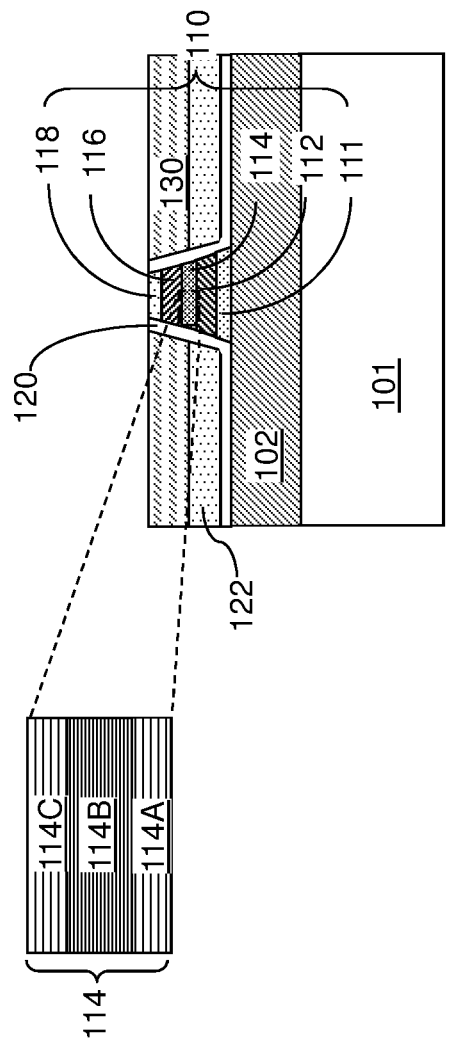
FIG. 7A
FIG. 7B

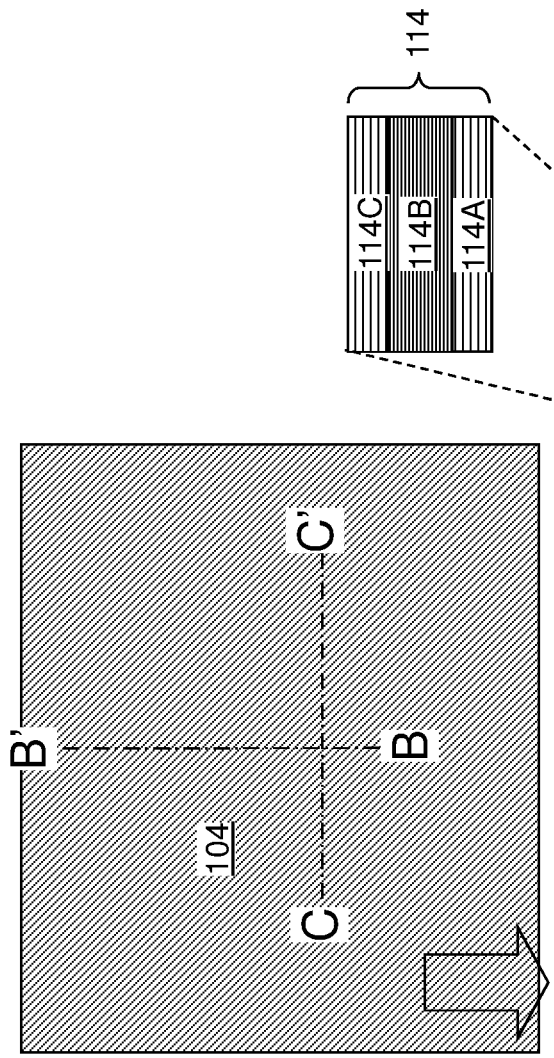
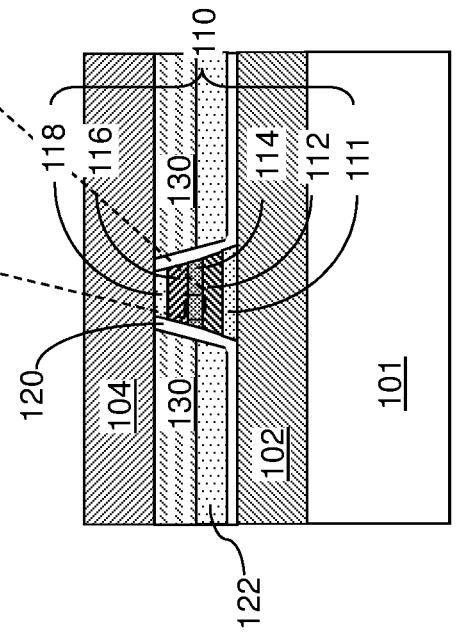
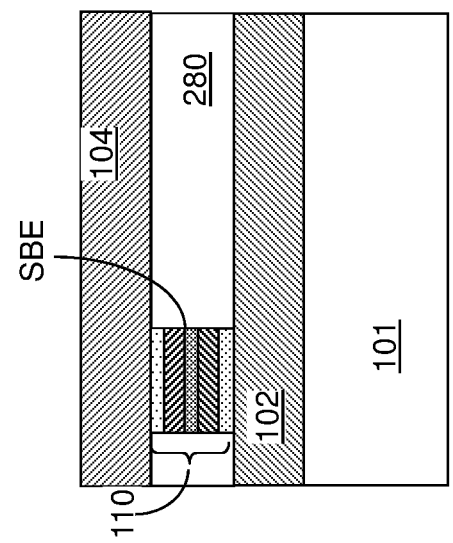
FIG. 8A
FIG. 8B
FIG. 8C

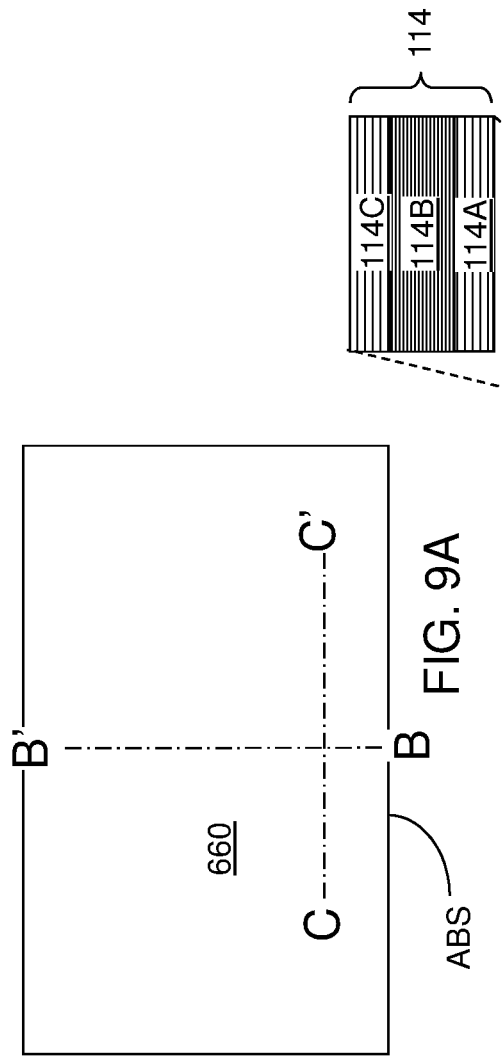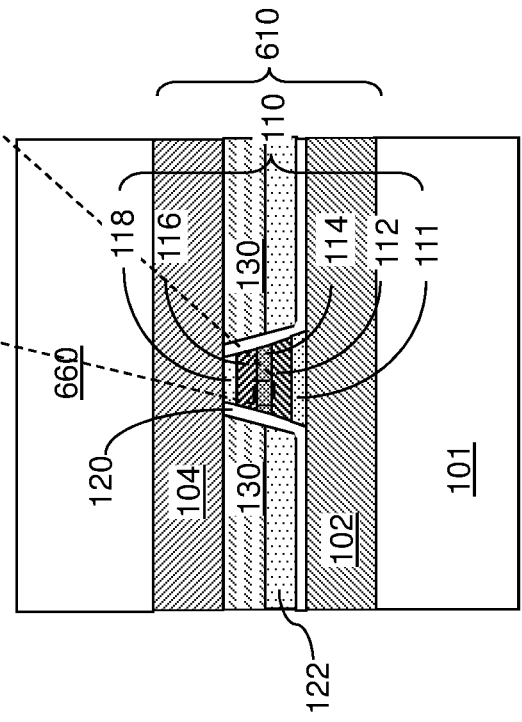

READ HEAD INCLUDING SEMICONDUCTOR SPACER AND LONG SPIN DIFFUSION LENGTH NONMAGNETIC CONDUCTIVE MATERIAL AND METHOD OF MAKING THEREOF

FIELD

The present disclosure relates generally to the field of hard disk drives, and particularly to a read head with a semiconductor spacer layer and methods of manufacturing the same.

BACKGROUND

Magnetic heads are employed to operate hard disk drives. A magnetic head can include a reading (i.e., read) head and a recording (i.e., writing or write) head. General structures and method of manufacture for prior art magnetic heads are disclosed, for example, in U.S. Patent Application Publication Nos. 2004/0097173 A1; 2007/0230063 A1; 2011/0294398 A1; and 2015/0260757 A1 and U.S. Pat. Nos. 8,291,743 B1; 8,361,541 B1; 8,443,510 B1; 8,717,709 B1; 8,735,565 B2; 8,964,333 B1; 9,153,261 B1; 9,321,146 B2; and 9,390,733 B2 the entire contents of which are incorporated herein.

SUMMARY

According to an aspect of the present disclosure, a read head includes a first ferromagnetic layer, a second ferromagnetic layer, a first diffusion-assist nonmagnetic metallic layer located between the first ferromagnetic layer and the second ferromagnetic layer, a second diffusion-assist nonmagnetic metallic layer located between the first ferromagnetic layer and the second ferromagnetic layer, and a semiconductor spacer layer located between the first diffusion-assist nonmagnetic metallic layer and the second diffusion-assist nonmagnetic metallic layer.

According to another aspect of the present disclosure, a method of forming read head is provided, which comprises: forming a first magnetic shield over a substrate; forming a sensor layer stack including, in order, a first ferromagnetic layer, a first diffusion-assist nonmagnetic metallic layer, a semiconductor spacer layer, a second diffusion-assist nonmagnetic metallic layer, and a second ferromagnetic layer; forming a read sensor stripe by patterning the sensor layer stack; and forming a second magnetic shield over the read sensor stripe.

BRIEF DESCRIPTION OF THE DRAWINGS

FIG. 4A illustrates a top-down view of an exemplary structure for forming a magnetic head after formation of a sensor layer stack according to an embodiment of the present disclosure.

FIG. 4B is a vertical cross-sectional view of a sensor region of the exemplary structure along the plane B-B' of FIG. 4A.

FIG. 5A illustrates a top-down view of the exemplary structure after formation of a read sensor stripe by patterning the sensor layer stack according to an embodiment of the present disclosure.

FIG. 5B is a vertical cross-sectional view of the sensor region of the exemplary structure along the plane B-B' of FIG. 5A.

FIG. 6A illustrates a top-down view of the exemplary structure after formation of an electrical isolation dielectric layer, a nonmagnetic spacer material layer, and a pair of nonmagnetic spacers according to an embodiment of the present disclosure.

FIG. 6B is a vertical cross-sectional view of the sensor region of the exemplary structure along the plane B-B' of FIG. 6A.

FIG. 7A illustrates a top-down view of the exemplary structure after formation of a pair of side shields according to an embodiment of the present disclosure.

FIG. 7B is a vertical cross-sectional view of the sensor region of the exemplary structure along the plane B-B' of FIG. 7A.

FIG. 8A illustrates a top-down view of the exemplary structure after application and patterning a sensor backside edge, after deposition of a dielectric fill material layer and a second magnetic shield according to an embodiment of the present disclosure.

FIG. 8B is a vertical cross-sectional view of the sensor region of the exemplary structure along the plane B-B' of FIG. 8A.

FIG. 8C is a vertical cross-sectional view of the sensor region of the exemplary structure along the plane C-C' of FIG. 8A.

FIG. 9A illustrates a top-down view of the exemplary structure after performing a lapping process to form an air bearing surface according to an embodiment of the present disclosure.

FIG. 9B is a vertical cross-sectional view of the sensor region of the exemplary structure along the plane B-B' of FIG. 9A.

FIG. 9C is a vertical cross-sectional view of the sensor region of the exemplary structure along the plane C-C' of FIG. 9A.

DETAILED DESCRIPTION

Figure 1:
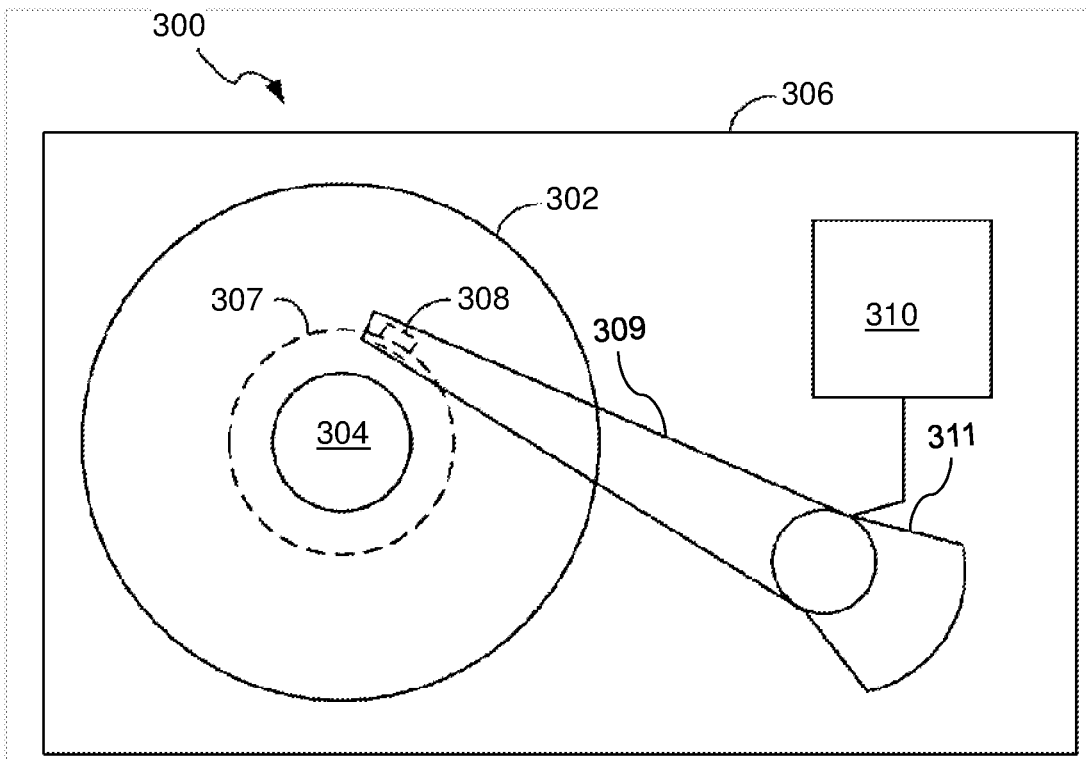
FIG. 1 is a top schematic view of a disk drive including a slider including read head of an embodiment of the present disclosure.

As described above, the present disclosure is directed to a read head including a semiconductor spacer and long spin diffusion length nonmagnetic conductive interlayers, (e.g., charge carrier diffusion-assist interlayers) located between two ferromagnetic layers and methods of manufacturing the same, the various aspects of which are described below in detail. The charge carrier diffusion-assist interlayers include nonmagnetic metal layers, such as Cu, Ag, Au or Ti that have a relatively long electron diffusion length.

The drawings are not drawn to scale. Multiple instances of an element may be duplicated where a single instance of the element is illustrated, unless absence of duplication of elements is expressly described or clearly indicated otherwise. Ordinals such as "first," "second," and "third" are employed merely to identify similar elements, and different ordinals may be employed across the specification and the claims of the instant disclosure. The same reference numerals refer to the same element or similar element. Unless otherwise indicated, elements having the same reference numerals are presumed to have the same composition. As used herein, a first element located "on" a second element can be located on the exterior side of a surface of the second element or on the interior side of the second element. As used herein, a first element is located "directly on" a second element if there exist a physical contact between a surface of the first element and a surface of the second element.

As used herein, a "layer" refers to a material portion including a region having a thickness. A layer may extend over the entirety of an underlying or overlying structure, or may have an extent less than the extent of an underlying or overlying structure. Further, a layer may be a region of a homogeneous or inhomogeneous continuous structure that has a thickness less than the thickness of the continuous structure. For example, a layer may be located between any pair of horizontal planes between, or at, a top surface and a bottom surface of the continuous structure. A layer may extend horizontally, vertically, and/or along a tapered surface. A substrate may be a layer, may include one or more layers therein, or may have one or more layer thereupon, thereabove, and/or therebelow.

Figure 2:
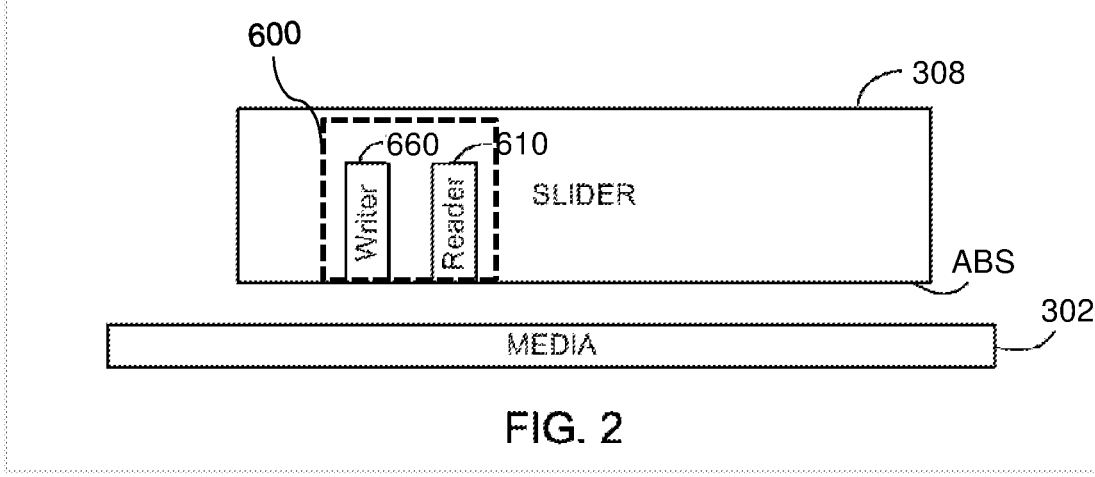
FIG. 2 is a side schematic view of the disk drive of FIG. 1.

FIG. 1 is a top schematic view of a hard disk drive 300 including a slider 308 with a read head of an embodiment of the present disclosure. FIG. 2 is a side schematic view of the slider 308 of FIG. 1 and illustrates the magnetic head 600 of the embodiments of the present disclosure. The disk drive 300 may include one or more of the disks/media 302 configured to store data. The disks/media 302 reside on a spindle assembly 304 that is mounted to a drive housing 306. Data may be stored along tracks 307 in the magnetic recording layer of disk 302. The reading and writing of data is accomplished with the magnetic head 600 that incorporates both the read head (i.e., a reader) 610 and a recording head 660 (i.e., a writer or a writing head). The slider 308 is part of a head-gimbal assembly (HGA) supported by one end of an actuator arm 309. The opposite end of the actuator arm 309 is connected to a head stack assembly (HSA) which may include a carriage and a voice coil motor 311. The recording head 660 is used to alter the properties of the magnetic recording layer of disk 302 and thereby write information thereto. The read head 610 is used to read information stored on the magnetic recording layer of the disk 302.

The read head 610 and the recording head 660 are disposed along an air bearing surface ABS of the slider 308. The ABS is the bottom surface of the slider 308, which is the slider surface that is the most proximate to the media 302. The separation distance between the ABS and the media 302 is self-limiting through the air flow between the ABS and the read head 610 and/or the writing head 660. In operation, a spindle motor (not shown) rotates the spindle assembly 304, and thereby rotates the disk 302 to position the magnetic head 600 containing the read head 610 and the writing head 660 at a particular location along a desired disk track 307. The position of the read head 610 and/or the recording head 660 relative to disk 302 may be controlled by a position control circuitry 310 which controls the HSA to move the actuator arm 309.

Figure 3:
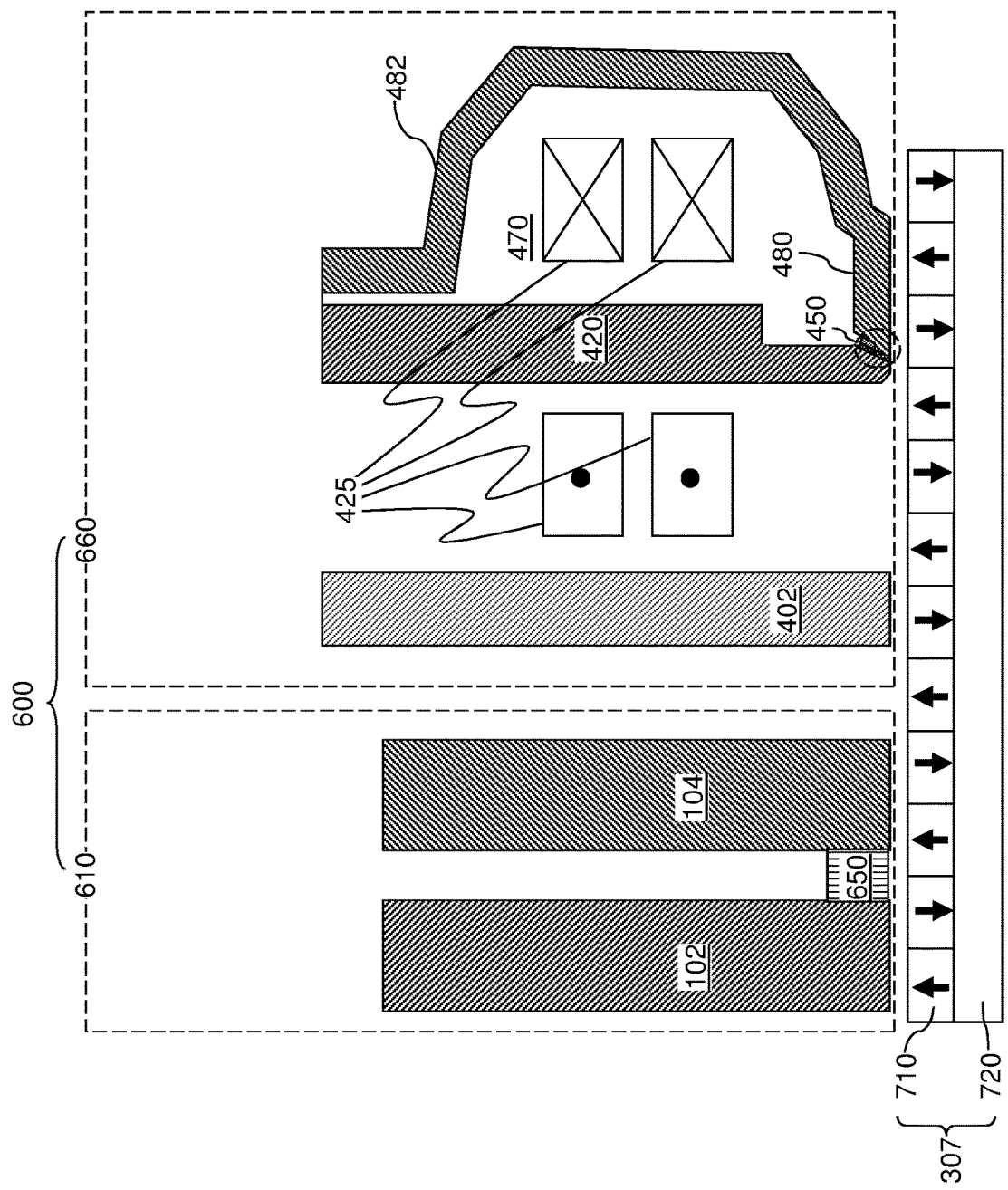
FIG. 3 is an in-track vertical cross-sectional view of an exemplary magnetic head incorporating the read head of the present disclosure.

Referring to FIG. 3, an in-track vertical cross-sectional view of an exemplary magnetic head 600 of an embodiment the present disclosure is illustrated. The magnetic head 600 is positioned over a recording track 307 on a disc media 302. The magnetic head 600 comprises, from the leading side of the head, a read head 610 and a recording (i.e., writing) head 660. The reading head comprises a lower reading shield 102, a read sensor 650 (i.e., a reading element), and an upper reading shield 104. The read sensor 650 can include a sensor layer stack 110 (e.g., magneto-resistive (MR) device) of the embodiments of the present disclosure, such as a giant magneto-resistive (GMR) stack (also referred to as a current perpendicular to plane (CPP) spin valve or CPP-GMR spin valve). The recording head 660 can comprise an optional auxiliary pole 402, a magnetic coil 425 that is wound around a main pole 420, a record element 450, and a trailing shield 480 which may be integrated with an upper pole 482. The record element 450 is formed between the main pole 420 and the trailing shield 480. An insulating material portion 470 is provided around the magnetic coil 425 between the main pole 420 and the trailing shield 480.

Referring to FIGS. 4A and 4B, an exemplary structure for forming a read head of the embodiments of the present disclosure is illustrated. The exemplary structure includes a substrate 101, which can be, for example, an aluminum titanium carbide substrate. A first magnetic shield 102 is formed within a sensor region of the exemplary structure. The first magnetic shield 102 includes a soft magnetic material, and may have a thickness in a range from 200 nm to 2,000 nm, although lesser and great thicknesses can also be employed. The first magnetic shield 102 can be subsequently patterned to provide the lower reading shield 102 of a magnetic head 600 in a finished product. In one embodiment, the first magnetic shield 102 can comprise, or consist essentially of, NiFe, NiCo, CoFe, NiFeCo, CoB, CoFeB, and/or combinations thereof.

A sensor layer stack (e.g., CPP-GMR spin valve) 110 can be deposited over the first magnetic shield 102 in the sensor region by sequential deposition of material layers. The sensor layer stack 110 can include a first ferromagnetic layer 112, a barrier spacer stack 114, and a second ferromagnetic layer 116. In one embodiment, the sensor layer stack 110 can further include a nonmagnetic seed layer 111 underneath the first ferromagnetic layer 112, and a nonmagnetic cap layer 118 above the second ferromagnetic layer 116. The nonmagnetic seed layer 111 is also referred to as a backside nonmagnetic conductive layer. The nonmagnetic cap layer 118 is also referred to as a front-side nonmagnetic conductive layer.

The nonmagnetic seed layer 111 can include a material layer or a layer stack that facilitates growth of subsequently layers. For example, the nonmagnetic seed layer 111 can include materials such as a graded nickel iron alloy and/or ruthenium, and can have a thickness in a range from 1 nm to 10 nm, such as 1-2 nm, although lesser and greater thicknesses can also be employed. In one embodiment, the nonmagnetic seed layer 111 can include at least one material selected from ruthenium, silver, and titanium. The nonmagnetic seed layer 111 is interposed between the first magnetic shield 102 and the first ferromagnetic layer 112 and functions as template for crystalline growth of grains of the first ferromagnetic layer 112. The crystallographic grains of the first ferromagnetic layer 112 can be aligned to crystallographic grains of the nonmagnetic seed layer 111.

The first ferromagnetic layer 112 can include at least one ferromagnetic alloy layer. In one embodiment, the first ferromagnetic layer 112 includes a single ferromagnetic alloy layer, such as Heusler alloy layer. The Heusler alloy layer may include any suitable ferromagnetic alloy having a formula $M_2TX$, where M is a first transition metal, T is a second transition metal different from the first transition metal and X is an element from Groups 13 to 17 of the Periodic Table of elements. For example, M may be Co, Ni, Fe, Pd and/or Mn, T may be Fe, Mn and/or V and X may be Si, Al, Ge, Sb, Ga and/or Sn. For example, the ferromagnetic alloy may consist essentially a cobalt-iron-aluminum (e.g., $Co_2FeAl$) alloy or a cobalt-manganese-germanium ($Co_2MnGe$) alloy.

In another embodiment, the first ferromagnetic layer 112 includes a ferromagnetic layer stack including at least two ferromagnetic material sublayers configured to tune the magnetostriction. For example, the multi-layer stack can include a stack of a NiFe5% layer and an amorphous CoFeBTa layer and/or a stack of a Ta layer and a CoFeB layer. The above described Heusler alloy layer can be deposited on the multi-layer stack in one embodiment. In yet another embodiment, the first ferromagnetic layer 112 can comprise a layer or a layer stack including various materials such as NiFe, NiCo, CoFe, Fe, NiFeCo, CoB, CoFeB, and/or combinations thereof.

The thickness of the first ferromagnetic layer 112 can be in a range from 0.8 nm to 3 nm, such as 1 nm to 2 nm, although lesser and greater thicknesses can also be employed. In one embodiment, the first ferromagnetic layer 112 can be a first free layer having a first magnetization having at least two preferred magnetization directions. The at least two preferred magnetization directions can be an up direction and a down direction if the first ferromagnetic layer 112 has positive axial magnetic anisotropy.

In another embodiment, the first ferromagnetic layer 112 can be a pinned layer having a fixed magnetization direction that does not change during operation of the device. In this case, a synthetic antiferromagnetic stack (not shown) can be interposed between the first magnetic shield 102 and the first ferromagnetic layer 112. For example, the synthetic antiferromagnetic stack can be located between the nonmagnetic seed layer 111 and the first ferromagnetic layer 112. The fixed magnetization of the first ferromagnetic layer 112 can be is pinned to a magnetization within the synthetic antiferromagnetic stack.

The barrier spacer stack 114 includes, from bottom to top, a first diffusion-assist nonmagnetic metallic layer 114A, a semiconductor spacer layer 114B, and a second diffusion-assist nonmagnetic metallic layer 114C.

In one embodiment, the diffusion-assist nonmagnetic metallic layers 114A and 114C comprise an electrically conductive, nonmagnetic layers which have a relatively long electron diffusion length, and which optionally can function as diffusion barriers which prevent or reduce diffusion of atoms therethrough. In one embodiment, each of the first diffusion-assist nonmagnetic metallic layer 114A and the second diffusion-assist nonmagnetic metallic layer 114C comprises an elemental metal having a face-centered-cubic (FCC) lattice structure. The FCC lattice structure of layers 114A and 114C, which when rotated 45 degrees, can lattice match the Heusler alloy of the first ferromagnetic layer 112 (e.g., a Heusler alloy having a L21, B2 lattice structure) and the semiconductor material of the semiconductor spacer layer 114B (e.g., CIGS semiconductor material having a chalcopyrite structure).

In one embodiment, each of the first diffusion-assist nonmagnetic metallic layer 114A and the second diffusion-assist nonmagnetic metallic layer 114C can have a thickness in a range from 1 monolayer of the elemental metal to 3 monolayers of the elemental metal. In one embodiment, each of the first diffusion-assist nonmagnetic metallic layer 114A and the second diffusion-assist nonmagnetic metallic layer 114C comprises a metal selected from Ag, Au, Cu, or Ti.

The semiconductor spacer layer 114B comprises semiconductor material, such as a compound semiconductor material. In one embodiment, the semiconductor spacer layer 114B includes a compound semiconductor material containing copper and selenium. In one embodiment, the semiconductor spacer layer 114B includes a material selected from a copper-indium-gallium-selenide (CIGS) material, a copper-indium-selenide (CIS) material, or a copper-gallium-selenide (CGS) material. Other suitable semiconductor materials may also be used. In an illustrative example, the semiconductor spacer layer 114B can include a material selected from $Cu(In_xGa_{1-x})Se_2$ where $0<x<1$, $CuInSe_2$, or $CuGaSe_2$.

In an illustrative example, a copper-indium-gallium-selenide material in a bulk form has a chalcopyrite crystal structure or zincblende crystal structure. In one embodiment, the semiconductor spacer layer 114B has a thickness in a range from 1 nm to 3 nm, such as 1.5 nm to 2.5 nm.

The second ferromagnetic layer 116 can include at least one ferromagnetic alloy layer. In one embodiment, the second ferromagnetic layer 116 include the same or different material from the first ferromagnetic layer 112. In one embodiment, the second ferromagnetic layer 116 includes a single ferromagnetic alloy layer, such as Heusler alloy layer. The Heusler alloy layer may include any suitable ferromagnetic alloy having a formula $M_2TX$, where M is a first transition metal, T is a second transition metal different from the first transition metal and X is an element from Groups 13 to 17 of the Periodic Table of elements. For example, M may be Co, Ni, Fe, Pd and/or Mn, T may be Fe, Mn and/or V and X may be Si, Al, Ge, Sb, Ga and/or Sn. For example, the ferromagnetic alloy may consist essentially a cobalt-iron-aluminum (e.g., $Co_2FeAl$) alloy or a cobalt-manganese-germanium ($Co_2MnGe$) alloy.

In another embodiment, the second ferromagnetic layer 116 includes a ferromagnetic layer stack including at least two ferromagnetic material sublayers configured to tune the magnetostriction. For example, the multi-layer stack can include a stack of a NiFe5% layer and an amorphous CoFeBTa layer, and/or a stack of a Ta layer and a CoFeB layer. The above described Heusler alloy layer can be deposited under the multi-layer stack in one embodiment. In yet another embodiment, the second ferromagnetic layer 116 can comprise a layer or a layer stack including various materials such as NiFe, NiCo, CoFe, Fe, NiFeCo, CoB, CoFeB, and/or combinations thereof.

The thickness of the second ferromagnetic layer 116 can be in a range from 0.8 nm to 3 nm, such as 1 nm to 2 nm, although lesser and greater thicknesses can also be employed. In one embodiment, the second ferromagnetic layer 116 can be a free layer having a magnetization having at least two preferred magnetization directions. The at least two preferred magnetization directions can be an up direction and a bottom direction if the second ferromagnetic layer 116 has positive axial magnetic anisotropy.

In one embodiment, the first ferromagnetic layer 112 can be a first free layer having a first free magnetization and the second ferromagnetic layer 116 can be a second free layer having a second free magnetization. In this case, the first ferromagnetic layer 112 and the second ferromagnetic layer 116 can have the same type of axial anisotropy, i.e., positive axial anisotropy or negative axial anisotropy. In another embodiment, the second ferromagnetic layer 116 can be a pinned layer having a fixed magnetization direction that does not change during operation of the device. In this case, a synthetic antiferromagnetic stack (not shown) can located over the second ferromagnetic layer 116.

Thus, in one embodiment, one of the first ferromagnetic layer 112 and the second ferromagnetic layer 116 may be a free layer and the other can be a pinned (e.g., reference) layer. In another embodiment both the first and the second ferromagnetic layers 112 and 116 may be free layers.

The nonmagnetic cap layer 118 can comprise, or consist essentially of, Ag, Ru, Ta, Ti, and/or combinations thereof. The thickness of the nonmagnetic cap layer 118 can be in a range from 1 nm to 10 nm, such as 1-2 nm, although lesser and greater thicknesses can also be employed. The nonmagnetic cap layer 118 can be interposed between the second ferromagnetic layer 116 and a second magnetic shield to be subsequently formed.

The sensor layer stack 110 can be deposited by a series of layer deposition processes such as chemical vapor deposition, atomic layer deposition, and/or physical vapor deposition. In other embodiments, other suitable materials known in the art can be used for any layer within the sensor layer stack 110.

Thermal processing steps can be used during formation of the sensor layer stack 110 to increase the grain size and/or to stabilize the crystal structure in the various material layers of the sensor layer stack 110. For example, an in-situ post-deposition thermal anneal process can be performed after deposition of the first ferromagnetic layer 112. A cryogenic cooling treatment (for example, down to at least the boiling point of liquid nitrogen) can be subsequently performed to reduce surface roughness and to enhance film uniformity for the deposited material layers up to the first ferromagnetic layer 112. The anneal may also cause discontinuities in the first ferromagnetic layer 112. The cryogenic cooling may remove the discontinuities and may the first ferromagnetic layer 112 continuous.

FIGS. 5A to 9C illustrate optional patterning steps and additional optional layers used to form the read head 610. It should be noted that other patterning steps may be used and that some of the optional layers may omitted or replaced with other layers.

Referring to FIGS. 5A and 5B, the sensor layer stack 110 is patterned to provide a read sensor stripe 110S between a pair of recess cavities. The read sensor stripe 110S can have a substantially uniform vertical cross-sectional view along planes parallel to the air bearing surface to be subsequently formed, which are parallel to the vertical cross-sectional plane of FIG. 5B. The read sensor stripe 110S can have a tapered profile such that upper layers within the patterned sensor layer stack 110 have lesser areas than lower layers within the patterned sensor layer stack 110.

The patterning of the sensor layer stack 110 can be performed, for example, by applying a photoresist layer 119 over the blanket (unpatterned) sensor layer stack 110, lithographically patterning the photoresist layer 119 to form a pair of openings separated by a rectangular area having parallel edges that are perpendicular to the air bearing surface to be subsequently formed, and performing a continuous ion milling process on the layers of the sensor layer stack 110 to provide a pair of openings through the sensor layer stack 110 with tapered sidewalls. The photoresist layer 119 can protect covered regions of the sensor layer stack 110 during the continuous ion milling and subsequent processes. The taper angle on the sidewalls of the patterned sensor layer stack 110 provides continuous reduction of the width of the layers in the sensor layer stack 110 within the read sensor stripe 110S.

Referring to FIGS. 6A and 6B, an electrical isolation dielectric layer 120 can be formed on the physically exposed top surfaces of the first magnetic shield 102 and on the sidewalls of the sensor layer stack 110, which include the sidewalls of the read sensor stripe 110S. The electrical isolation dielectric layer 120 includes a dielectric material that provides electrical isolation, and may be formed by a conformal deposition process. For example, the electrical isolation dielectric layer 120 can comprise, or consist essentially of, aluminum oxide, magnesium oxide, silicon nitride, silicon oxide, and/or combinations or stacks thereof.

A nonmagnetic spacer material layer can be deposited on the electrical isolation dielectric layer 120. In one embodiment, the nonmagnetic spacer material layer can comprise, or consist essentially of, NiFeCr, NiCr, Ta, Ru, Cr, oxides thereof, and/or combinations thereof.

An angled milling process can be performed to remove vertical and tapered portions of the nonmagnetic spacer material layer. Specifically, the vertical and tapered portions of the nonmagnetic spacer material layer can be removed along the angled sides of the sensor layer stack 110. In one embodiment, the angled milling process removes portions of the nonmagnetic spacer material layer along the angled sides of the sensor layer stack 110 located at and above the second ferromagnetic layer 116. Each remaining portion of nonmagnetic spacer material layer underlying the horizontal plane including the bottom surface of the second ferromagnetic layer 116 constitutes a nonmagnetic spacer 122. A pair of nonmagnetic spacers 122 is formed on the sidewalls of the read sensor stripe 110S over planar (horizontal) portions of the electrical isolation dielectric layer 120 that contact the first magnetic shield 102. Each nonmagnetic spacer 122 has a respective top surface below the horizontal plane including the bottom surface of the second ferromagnetic layer 116. The pair of nonmagnetic spacers 122 is laterally spaced from the read sensor stripe 110S by tapered portions of the electrical isolation dielectric layer 120. A remaining portion of the nonmagnetic spacer material layer overlying the photoresist layer 119 constitutes a nonmagnetic material layer 122'.

Referring to FIGS. 7A and 7B, a ferromagnetic side shield material layer can be anisotropically deposited. The ferromagnetic side shield material layer can include iron, cobalt, or a cobalt-iron alloy. A top surface of the ferromagnetic side shield material layer overlying the nonmagnetic spacers 122 can be at the level of the interface between the electrical isolation dielectric layer 120 and the photoresist layer 119.

An angled milling process can be performed to selectively remove vertical and tapered portions of the ferromagnetic side shield material layer. Specifically, the vertical and tapered portions of the ferromagnetic side shield material layer can be removed along the angled sides of the sensor layer stack 110. In one embodiment, the angled milling process removes portions of the ferromagnetic side shield material layer along the angled sides of the sensor layer stack 110 located above the nonmagnetic cap layer 118. Each remaining portions of ferromagnetic side shield material layer underlying filling a pair of cavities in the sensor layer stack 110 constitutes a pair of side shields 130. The pair of side shields 130 is formed on the sidewalls of the electrical isolation dielectric layer 120 over the horizontal plane including the bottom surfaces of the second ferromagnetic layer 116. The pair of side shields 130 is laterally spaced from the read sensor stripe 110S by the electrical isolation dielectric layer 120, and overlies the pair of nonmagnetic spacers 122.

Vertical portions of the electrical isolation dielectric layer 120 that overlie the pair of side shields 130 can be removed by the angled milling process. The photoresist layer 119, the nonmagnetic material layer 122', and a remaining portion of the ferromagnetic side shield material layer overlying the photoresist layer 119 can be subsequently removed, for example, by a lift-off process that lifts off the photoresist layer 119. For example, a wet etch process employing a solvent that dissolves, and/or lifts off, the photoresist layer 119 may be employed. The pair of side shields 130 is formed on the electrical isolation dielectric layer 120 on both sides of the read sensor stripe 110S.

The pair of side shields 130 is spaced from the first magnetic shield 102 by a planar (horizontal) portion of the electrical isolation dielectric layer 120 having a planar surface that is parallel to an interface between the first magnetic shield 102 and the sensor layer stack 110. The pair of side shields 130 can be formed directly on the pair of nonmagnetic spacers 122. Further, the pair of side shields 130 can be formed directly on a respective tapered sidewall of the electrical isolation dielectric layer 120. A top surface of the nonmagnetic cap layer 118 can be physically exposed, which may be coplanar with, raised above, or recessed below, top surfaces of the pair of side shields 130. The pair of side shields 130 provides a magnetic bias to the second ferromagnetic layer 116 and/or in the first ferromagnetic layer 112 along the horizontal direction, which is the cross-track direction during operation of the magnetic head 600.

Referring to FIGS. 8A-8C, a photoresist layer (not shown) for patterning the backside edge of each magnetic sensor is applied and patterned over the exemplary structure. The photoresist layer is applied and patterned to form an opening having a straight edge that is parallel to the air bearing surface. The straight edge can overlie a back side of the read sensor stripe 110S and back sides of the pair of side shields 130. As used herein, a "backside" or "back side" refers to a side that is distal from the air bearing surface to be subsequently formed, and a "front side" refers to a side that is proximal to the air bearing surface to be subsequently formed. In one embodiment, the opening in the photoresist layer can have a substantially rectangular shape.

Unmasked portions of the material layers overlying the first magnetic shield 102 are patterned by transferring the pattern of the photoresist layer therethrough. In one embodiment, a first ion milling process can be performed employing the photoresist layer as an ion milling mask layer. A backside edge of the sensor layer stack 110 (e.g., the read sensor stripe 110S) is formed, which is herein referred to as a sensor backside edge SBE. The sensor backside edge SBE is formed at a periphery of a recess cavity that underlies the opening in the photoresist layer.

A dielectric material, such as aluminum oxide, tantalum oxide, silicon oxide or silicon nitride is deposited in the recessed region and over the patterned read sensor stack 110. Excess portions of the dielectric material is removed from above the horizontal plane including the top surface of the patterned read sensor stack 110. A remaining portion of the dielectric material forms a dielectric fill layer 280 behind patterned read sensor stack 110. The dielectric fill layer 280 includes a dielectric material such as aluminum oxide, tantalum oxide, silicon oxide, silicon nitride, or combinations thereof.

A second magnetic shield 104 is then formed on the sensor layer stack 110 and the pair of side shields 130. The second magnetic shield 104 includes a soft magnetic material, and may have a thickness in a range from 200 nm to 2,000 nm, although lesser and great thicknesses can also be employed. The second magnetic shield 104 can be subsequently patterned to provide the upper reading shield 104 of a magnetic head 600 in a finished product.

Referring to FIGS. 9A-9C, the writing head 660 is then formed over the read head 610. A lapping process is then performed on the exemplary structure to provide an air bearing surface (ABS).

Figure 10:
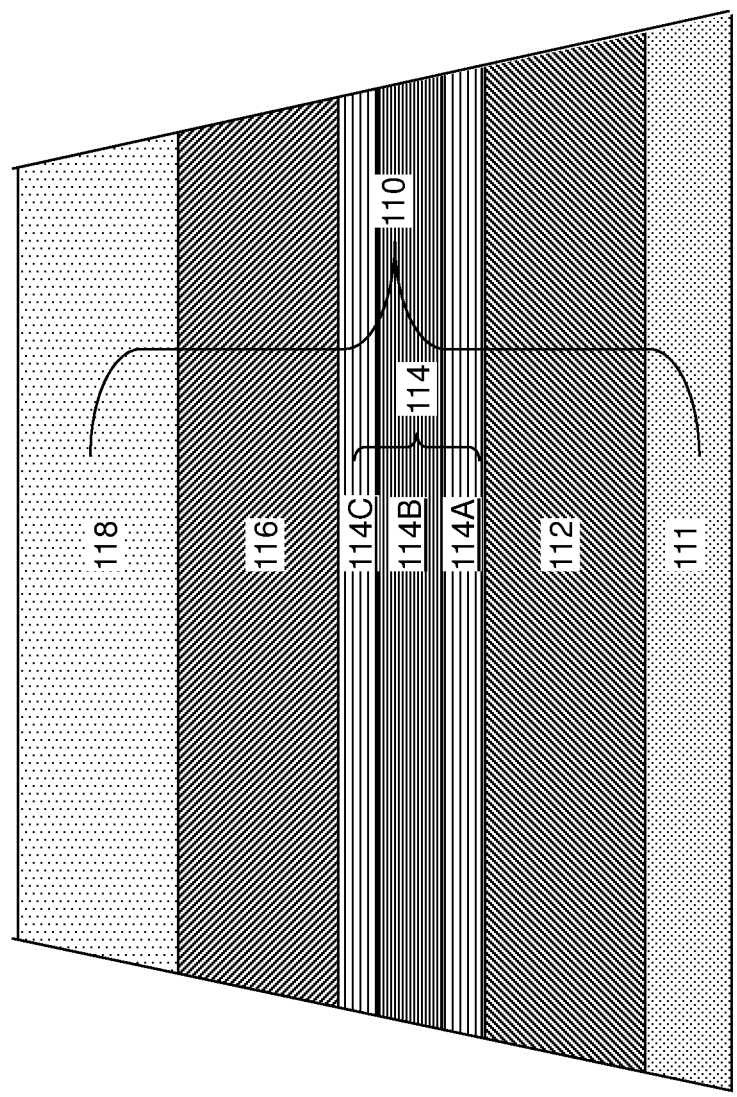
FIG. 10 is a magnified vertical cross-sectional view of a first exemplary sensor layer stack according to an embodiment of the present disclosure.

Referring to FIG. 10, a first exemplary sensor layer stack 110 according to an embodiment of the present disclosure is illustrated, which includes, and in one embodiment may consist only of, from bottom to top, a nonmagnetic seed layer 111, a first ferromagnetic layer 112, a barrier spacer stack 114, a second ferromagnetic layer 116, and a nonmagnetic cap layer 118. The barrier spacer stack 114 includes, from bottom to top, a first diffusion-assist nonmagnetic metallic layer 114A, a semiconductor spacer layer 114B, and a second diffusion-assist nonmagnetic metallic layer 114C. The first ferromagnetic layer 112 can be a first free layer, and the second ferromagnetic layer 116 can be a second free layer.

Figure 11:
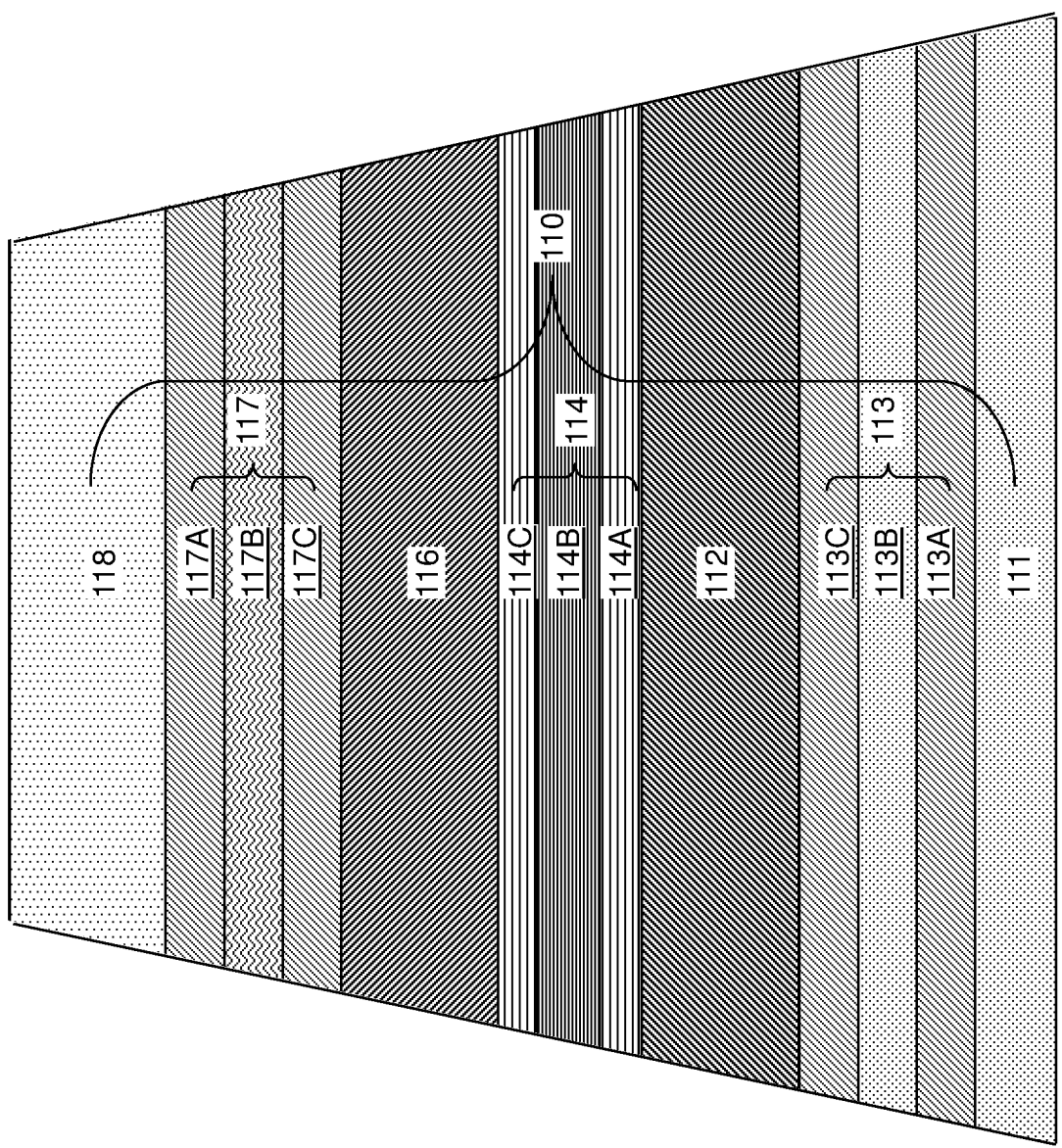
FIG. 11 is a magnified vertical cross-sectional view of a second exemplary sensor layer stack according to an embodiment of the present disclosure.

Referring to FIG. 11, a second exemplary sensor layer stack 110 according to an embodiment of the present disclosure is illustrated, which is configured to provide tunable magnetostriction. At least one magnetostriction modulation layer stack (113, 117) may be included within the sensor layer stack 110. Specifically, the sensor layer stack 110 can include at least one of a seed-side magnetostriction modulation layer stack 113 and/or a cap-side magnetostriction modulation layer stack 117. Thus, the sensor layer stack 110 can include, from bottom to top, a nonmagnetic seed layer 111, an optional seed-side magnetostriction modulation layer stack 113, a first ferromagnetic layer 112, a barrier spacer stack 114, a second ferromagnetic layer 116, an optional cap-side magnetostriction modulation layer stack 117, and a nonmagnetic cap layer 118. The barrier spacer stack 114 includes, from bottom to top, a first diffusion-assist nonmagnetic metallic layer 114A, a semiconductor spacer layer 114B, and a second diffusion-assist nonmagnetic metallic layer 114C. The first ferromagnetic layer 112 can be a first free layer, and the second ferromagnetic layer 116 can be a second free layer.

Each of the first ferromagnetic layer 112 and the second ferromagnetic layer 116 can have large positive magnetostriction. The seed-side magnetostriction modulation layer stack 113 and/or the cap-side magnetostriction modulation layer stack 117 can include a negative magnetostriction material layer (113A, 117A) that can provide negative magnetostriction to reduce the positive magnetostriction provided by the first ferromagnetic layer 112 and the second ferromagnetic layer 116. The negative magnetostriction material layers (113A, 117A) can be spaced from the first ferromagnetic layer 112 and the second ferromagnetic layer 116 by a combination of an amorphous nonmagnetic material layer (113B, 117B) and an amorphous magnetic material layer (113C, 117C). In one embodiment, the seed-side magnetostriction modulation layer stack 113 can include, from bottom to top (i.e., in a direction toward the barrier spacer stack 114), a seed-side negative magnetostriction material layer 113A, a seed-side amorphous nonmagnetic material layer 113B, and a seed-side amorphous magnetic material layer 113C. The cap-side magnetostriction modulation layer stack 117 can include, from bottom to top (i.e., in a direction away from the barrier spacer stack 114), a cap-side amorphous magnetic material layer 117C, a cap-side amorphous nonmagnetic material layer 117B, and a cap-side negative magnetostriction material layer 117A. In an illustrative example, the negative magnetostriction material layers (113A, 117A) can include NiFe5%, the amorphous nonmagnetic material layers (113B, 117B) can include amorphous tantalum, and the amorphous magnetic material layers (113C, 117C) can include amorphous CoFeB alloy.

Figure 12:
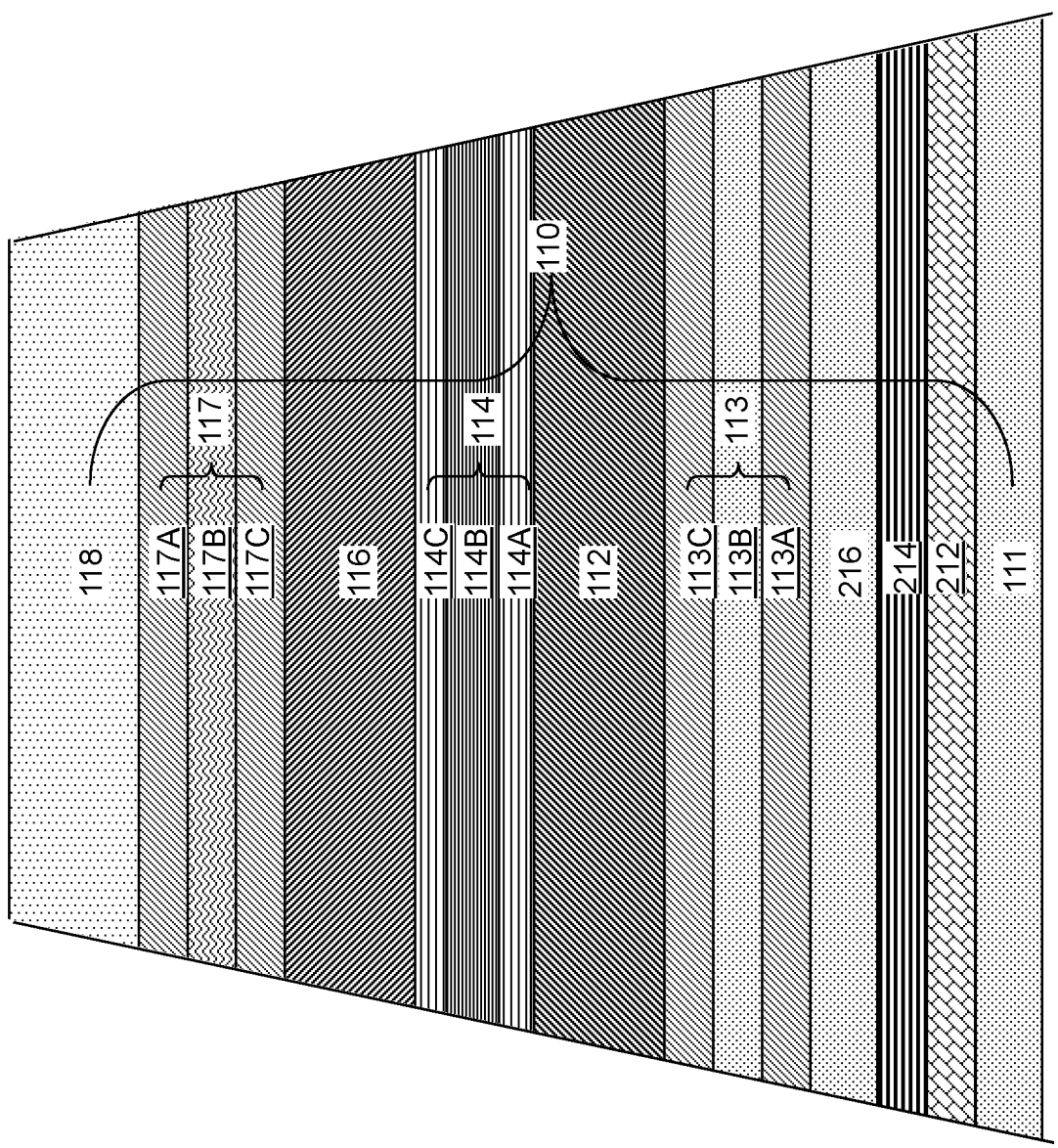
FIG. 12 is a magnified vertical cross-sectional view of a third exemplary sensor layer stack according to an embodiment of the present disclosure.

Referring to FIG. 12, a third exemplary sensor layer stack 110 according to an embodiment of the present disclosure is illustrated, which can be derived from the second exemplary sensor layer stack 110 by inserting a synthetic antiferromagnetic (SAF) structure (212, 214, 216) between the nonmagnetic seed layer 111 and the first ferromagnetic layer 112. The first ferromagnetic layer 112 becomes a pinned (i.e., reference) layer having a fixed magnetization direction, and sensing of magnetization can be performed by the second ferromagnetic layer 116 that becomes the only free layer within the third exemplary sensor layer stack 110.

The SAF structure (212, 214, 216) can include an antiferromagnetic pinning layer 212, a ferromagnetic pinned layer 214, and a nonmagnetic spacer layer 216. The antiferromagnetic pinning layer 212 can comprise, or consist essentially of, IrMn, IrMnCr, and/or combinations thereof. The ferromagnetic pinned layer 214 can comprise CoFe, CoB, CoFeB, and/or combinations thereof. The nonmagnetic spacer layer 216 includes a nonmagnetic material such as ruthenium. The SAF structure (212, 214, 216) fixes the direction of magnetization of the first ferromagnetic layer 112, causing the first ferromagnetic layer 112 to function as a pinned magnetization layer.

In one embodiment, at least one of the seed-side magnetostriction modulation layer stack 113 and/or the cap-side magnetostriction modulation layer stack 117 may be present within the third exemplary sensor layer stack 110. If the seed-side magnetostriction modulation layer stack 113 is present within the third exemplary sensor layer stack 110, then the SAF structure (212, 214, 216) can be provided between the nonmagnetic seed layer 111 and the seed-side magnetostriction modulation layer stack 113.

In another embodiment, if the cap-side magnetostriction modulation layer stack 117 is present within the third exemplary sensor layer stack 110, then the negative magnetostriction material layer 113A such as NiFe5% can be replaced with a cobalt layer.

Figure 13:
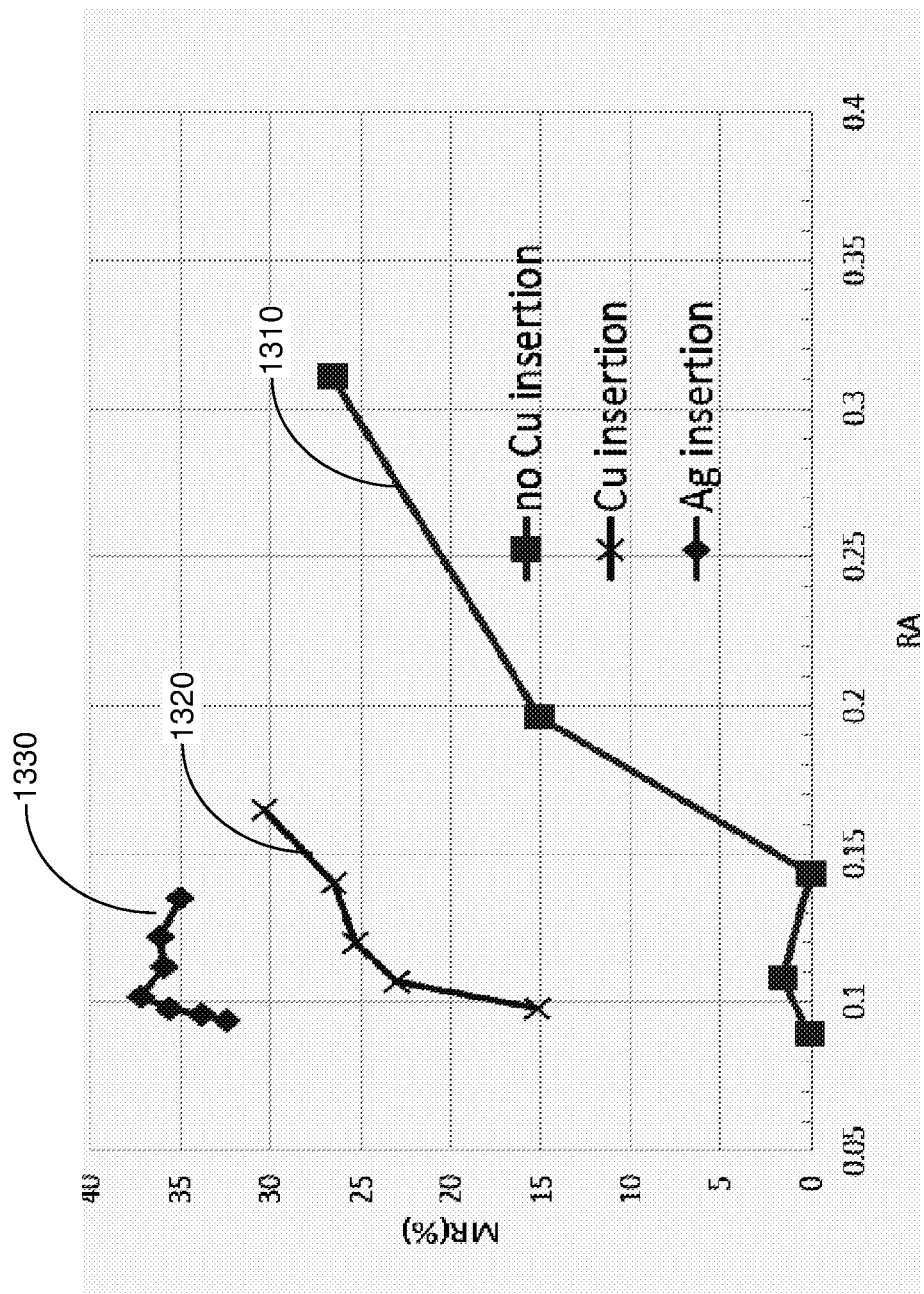
FIG. 13 is a graph of a magnetoresistance for various sensor layer stacks as a function of a resistance-area (RA) product according to embodiments of the present disclosure.

Referring to FIG. 13, the relationship between a resistance-area (RA) product (e.g., in units of Ohm-microns square) and MR ratio is calculated and plotted for three sensor layer stacks. The first curve 1310 represents the relationship between RA and MR ratio for a first comparative example sensor layer stack that is derived from the first exemplary sensor layer stack 110 of FIG. 10 by removing the first diffusion-assist nonmagnetic metallic layer 114A and the second diffusion-assist nonmagnetic metallic layer 114C. In other words, only the semiconductor spacer layer 114B remains out of the barrier spacer layer stack 114 of the first exemplary sensor layer stack 110 of FIG. 10.

The second curve 1320 represents the relationship between RA and MR ratio for a second exemplary sensor layer stack 110 of FIG. 10 which includes copper first diffusion-assist nonmagnetic metallic layer 114A and copper second diffusion-assist nonmagnetic metallic layer 114C. The third curve 1330 represents the relationship between RA and MR ratio for a third exemplary sensor layer stack 110 of FIG. 10 which includes a silver first diffusion-assist nonmagnetic metallic layer 114A and a silver second diffusion-assist nonmagnetic metallic layer 114C.

The use of copper layers as the first diffusion-assist nonmagnetic metallic layer 114A and the second diffusion-assist nonmagnetic metallic layer 114C within a barrier spacer layer stack 114 improves MR ratio compared to the comparative example, especially for low RA values. The use of silver layers as the first diffusion-assist nonmagnetic metallic layer 114A and the second diffusion-assist nonmagnetic metallic layer 114C within a barrier spacer layer stack 114 improves the MR ratio for low RA values even more than use of the copper layers. Thus, MR can be detected (e.g., has a value between 15 and 39%) for low RA values (e.g., below 0.2, such as between 0.1 and 0.15 Ohm-microns square) for the second and third exemplary sensor layer stacks, but essentially cannot be detected (e.g., MR value below 3%) for the comparative example sensor layer stack.

Without being bound by any particular theory, the long electron diffusion length of the first diffusion-assist nonmagnetic metallic layer 114A and the second diffusion-assist nonmagnetic metallic layer 114C is believed to be a factor in increasing the MR ratio in the barrier spacer layer stack 114 of the embodiments of the present disclosure by reducing interlayer coupling between the first and the second ferromagnetic layers (112, 116). Thus, the long spin diffusion length of the diffusion-assist nonmagnetic metallic layers (114A, 114C) can keep the high spin polarization of the ferromagnetic layers, such as the Heusler alloy ferromagnetic layers (112, 116) and reduce the interlayer coupling to achieve ultra-low RA with reasonable MR value.

Further, it is believed that lattice matching between the crystal structure of the semiconductor spacer layer 114B and the thin films of the first diffusion-assist nonmagnetic metallic layer 114A and the second diffusion-assist nonmagnetic metallic layer 114C may contribute to improved semiconductor spacer layer 114B grain size and interface properties by improving grain growth during deposition of the semiconductor spacer layer 114B and/or by reducing or preventing interdiffusion between the semiconductor spacer layer 114B and the ferromagnetic layers (112, 116).

Figure 14:
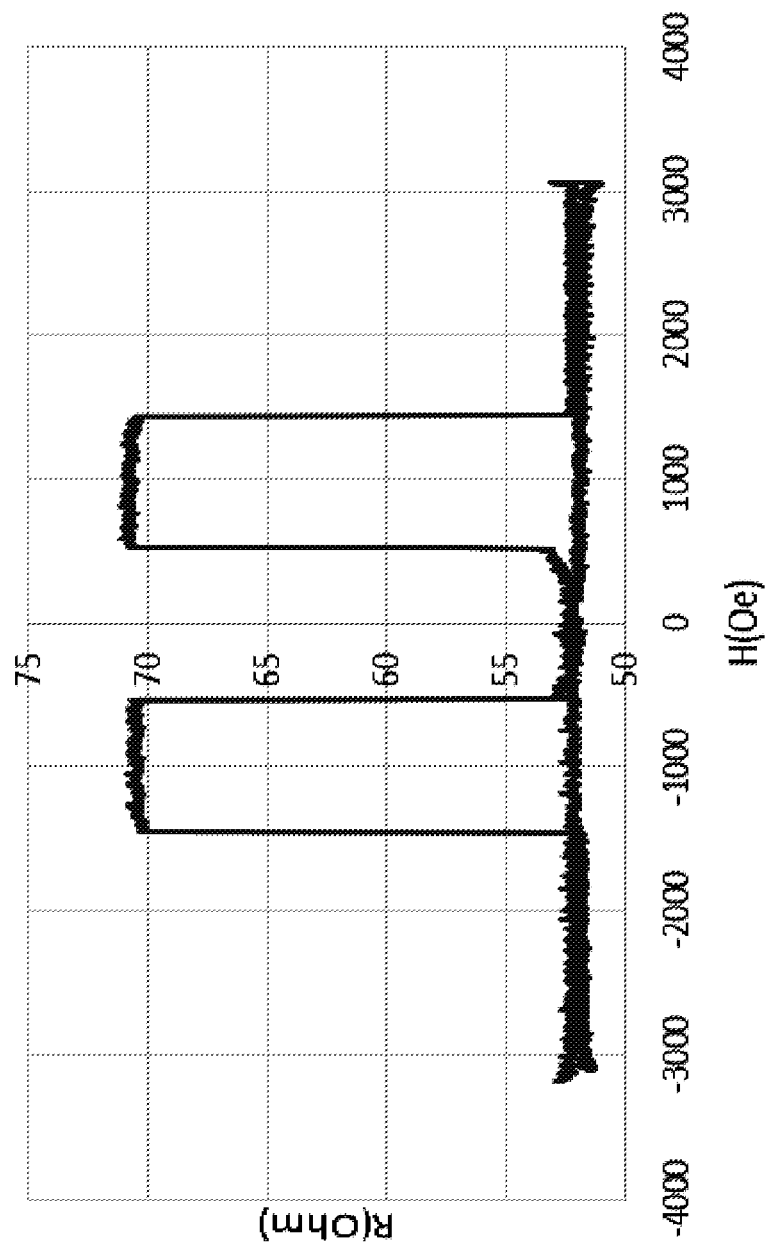
FIG. 14 is an R-H graph of a resistance of a sensor layer stack of an embodiment of the present disclosure as a function of an external magnetic field.

Referring to FIG. 14, an R-H curve of resistance (in Ohms) as a function of an applied magnetic field (in Oe) is plotted for a sensor layer stack 110 of an embodiment of the present disclosure that includes silver first diffusion-assist nonmagnetic metallic layer 114A and silver second diffusion-assist nonmagnetic metallic layer 114C. A resistance-area product of 0.098 Ohm-$\mu m^2$ with MR ratio of 39% is used in FIG. 14.

Referring to all embodiments described above, a read head 610 includes a first ferromagnetic layer 112, a second ferromagnetic layer 116, a first diffusion-assist nonmagnetic metallic layer 114A located between the first ferromagnetic layer and the second ferromagnetic layer, a second diffusion-assist nonmagnetic metallic layer 114C located between the first ferromagnetic layer and the second ferromagnetic layer, and a semiconductor spacer layer 114B located between the first diffusion-assist nonmagnetic metallic layer and the second diffusion-assist nonmagnetic metallic layer.

In one embodiment, the semiconductor spacer layer 114B directly contacts both the first diffusion-assist nonmagnetic metallic layer 114A and the second diffusion-assist nonmagnetic metallic layer 114C. In one embodiment, the first ferromagnetic layer 112 directly contacts the first diffusion-assist nonmagnetic metallic layer 114A, and the second ferromagnetic layer 116 directly contacts the second diffusion-assist nonmagnetic metallic layer 114C.

In one embodiment, each of the first diffusion-assist nonmagnetic metallic layer 114A and the second diffusion-assist nonmagnetic metallic layer 114C comprises a metal selected from Ag, Au, Cu, or Ti. The semiconductor spacer layer 114B comprises a material selected from copper-indium-gallium-selenide, copper-indium-selenide or copper-gallium-selenide. At least one of the first ferromagnetic layer 112 and the second ferromagnetic layer 116 comprises a ferromagnetic Heusler alloy layer, such as a $Co_2FeAl$ alloy or a $Co_2MnGe$ alloy layer In one embodiment, each of the first diffusion-assist nonmagnetic metallic layer 114A and the second diffusion-assist nonmagnetic metallic layer 114C comprises an elemental metal selected from Ag, Cu, Au or Ti which has a thickness in a range from 1 monolayer of the elemental metal to 3 monolayers of the elemental metal, the semiconductor spacer layer 114B has a thickness in a range from 1 nm to 3 nm, and each of the first ferromagnetic layer 112 and the second ferromagnetic layer 116 has a thickness in a range from 0.8 nm to 3 nm.

In another embodiment shown in FIG. 11, at least one of the first ferromagnetic layer and the second ferromagnetic layer comprises a layer stack comprising a negative magnetostriction material layer (113A, 117A), an amorphous nonmagnetic material layer (113B, 117B), an amorphous magnetic material layer (113C, 117C) and a Heusler alloy magnetic material layer (112, 116). In one embodiment, the negative magnetostriction material layer comprises a NiFe5% alloy, the amorphous nonmagnetic material layer comprises amorphous tantalum which directly contacts the negative magnetostriction material layer, the amorphous magnetic material layer comprises an amorphous CoFeB alloy which directly contacts the amorphous nonmagnetic material layer, and the Heusler alloy magnetic material layer comprises a $Co_2FeAl$ alloy or a $Co_2MnGe$ alloy which directly contacts the amorphous magnetic material layer.

In some embodiments shown in FIGS. 10 and 11, the first ferromagnetic layer 112 is a first free layer having a first magnetization having at least two preferred magnetization directions, and the second ferromagnetic layer 116 is a second free layer having a second magnetization having at least two preferred magnetization directions.

In another embodiment shown in FIG. 12, a synthetic antiferromagnetic stack (212, 214, 216) is provided, such that one of the first and the second ferromagnetic layers (112, 116) comprises a free layer and the other one of the first and the second ferromagnetic layers (112, 116) comprises a pinned reference layer.

In one embodiment the read head further comprises a first magnetic shield 102 and a second magnetic shield 104. A sensor layer stack 110 comprising the first ferromagnetic layer, the second ferromagnetic layer, the first diffusion-assist nonmagnetic metallic layer, the second diffusion-assist nonmagnetic metallic layer and the semiconductor spacer layer is located between the first magnetic shield 102 and the second magnetic shield 104.

The various sensor layer stacks 110 of the embodiments of the present disclosure can be included in a read head of a magnetic head of a hard disk drive, such as a hard disk drive 300 shown in FIGS. 1 and 2. As described above, the hard disk drive 300 can include a slider 308 supporting the magnetic head 600, an actuator arm 309 supporting the slider, a motor 310 configured to control the actuator arm, and a magnetic disk 302. The first diffusion-assist nonmagnetic metallic layer 114A and/or the second diffusion-assist nonmagnetic metallic layer 114C can significantly increase magnetoresistance for a layer stack having a low resistance-area product, thereby increasing the sensitivity of the read head.

Although the foregoing refers to particular preferred embodiments, it will be understood that the disclosure is not so limited. It will occur to those of ordinary skill in the art that various modifications may be made to the disclosed embodiments and that such modifications are intended to be within the scope of the disclosure. Where an embodiment employing a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art. All of the publications, patent applications and patents cited herein are incorporated herein by reference in their entirety.

What is claimed is:

1. A read head, comprising:
a first ferromagnetic layer;
a second ferromagnetic layer;
a first diffusion-assist nonmagnetic metallic layer located between the first ferromagnetic layer and the second ferromagnetic layer;
a second diffusion-assist nonmagnetic metallic layer located between the first ferromagnetic layer and the second ferromagnetic layer; and
a semiconductor spacer layer located between the first diffusion-assist nonmagnetic metallic layer and the second diffusion-assist nonmagnetic metallic layer;
wherein each of the first diffusion-assist nonmagnetic metallic layer and the second diffusion-assist nonmagnetic metallic layer comprises a metal selected from Ag, Au, Cu, or Ti; and
wherein the semiconductor spacer layer comprises a material selected from copper-indium-gallium-selenide, copper-indium-selenide or copper-gallium-selenide.

2. The read head of claim 1, wherein the semiconductor spacer layer directly contacts both the first diffusion-assist nonmagnetic metallic layer and the second diffusion-assist nonmagnetic metallic layer.

3. The read head of claim 1, wherein:
the first ferromagnetic layer directly contacts the first diffusion-assist nonmagnetic metallic layer; and
the second ferromagnetic layer directly contacts the second diffusion-assist nonmagnetic metallic layer.

4. The read head of claim 1, wherein at least one of the first ferromagnetic layer and the second ferromagnetic layer comprises a ferromagnetic Heusler alloy layer.

5. The read head of claim 4, wherein the first ferromagnetic layer and the second ferromagnetic layer comprises a $Co_2FeAl$ alloy or a $Co_2MnGe$ alloy.

6. The read head of claim 1, wherein each of the first diffusion-assist nonmagnetic metallic layer and the second diffusion-assist nonmagnetic metallic layer has a thickness in a range from 1 monolayer of the elemental metal to 3 monolayers of the metal.

7. The read head of claim 6, wherein the semiconductor spacer layer has a thickness in a range from 1 nm to 3 nm.

8. The read head of claim 7, wherein each of the first ferromagnetic layer and the second ferromagnetic layer has a thickness in a range from 0.8 nm to 3 nm.

9. The read head of claim 1, wherein:
the first ferromagnetic layer is a first free layer having a first magnetization having at least two preferred magnetization directions; and
the second ferromagnetic layer is a second free layer having a second magnetization having at least two preferred magnetization directions.

10. The head of claim 1, further comprising a synthetic antiferromagnetic stack, wherein one of the first and the second ferromagnetic layers comprises a free layer and the other one of the first and the second ferromagnetic layers comprises a pinned reference layer.

11. The head of claim 1, further comprising a first magnetic shield and a second magnetic shield, wherein a sensor layer stack comprising the first ferromagnetic layer, the second ferromagnetic layer, the first diffusion-assist nonmagnetic metallic layer, the second diffusion-assist nonmagnetic metallic layer and the semiconductor spacer layer is located between the first magnetic shield and the second magnetic shield.

12. A hard disk drive, comprising:
a magnetic head containing the read head of claim 1;
a slider supporting the magnetic head;
an actuator arm supporting the slider; and
a motor configured to control the actuator arm.

13. A read head, comprising:
a first ferromagnetic layer;
a second ferromagnetic layer;
a first diffusion-assist nonmagnetic metallic layer located between the first ferromagnetic layer and the second ferromagnetic layer;
a second diffusion-assist nonmagnetic metallic layer located between the first ferromagnetic layer and the second ferromagnetic layer; and
a semiconductor spacer layer located between the first diffusion-assist nonmagnetic metallic layer and the second diffusion-assist nonmagnetic metallic layer;
wherein at least one of the first ferromagnetic layer and the second ferromagnetic layer comprises a layer stack comprising a negative magnetostriction material layer, an amorphous nonmagnetic material layer, an amorphous magnetic material layer and a Heusler alloy magnetic material layer.

14. The read head of claim 13, wherein:
the negative magnetostriction material layer comprises a NiFe5% alloy;
the amorphous nonmagnetic material layer comprises amorphous tantalum which directly contacts the negative magnetostriction material layer;
the amorphous magnetic material layer comprises an amorphous CoFeB alloy which directly contacts the amorphous nonmagnetic material layer; and
the Heusler alloy magnetic material layer comprises a $Co_2FeAl$ alloy or a $Co_2MnGe$ alloy which directly contacts the amorphous magnetic material layer.

* * * * *